(12) United States Patent
Dorschner

(10) Patent No.: US 9,631,973 B2
(45) Date of Patent: Apr. 25, 2017

(54) MULTIFUNCTION IMAGER

(71) Applicant: RAYTHEON COMPANY, Waltham, MA (US)

(72) Inventor: Terry Dorschner, Marlborough, MA (US)

(73) Assignee: RAYTHEON COMPANY, Waltham, MA (US)

(*) Notice: Subject to any disclaimer, the term of this patent is extended or adjusted under 35 U.S.C. 154(b) by 307 days.

(21) Appl. No.: 14/340,072

(22) Filed: Jul. 24, 2014

(65) Prior Publication Data

US 2015/0168210 A1 Jun. 18, 2015

Related U.S. Application Data

(60) Provisional application No. 61/915,652, filed on Dec. 13, 2013.

(51) Int. Cl.
*G01J 1/04* (2006.01)
*G02F 1/1347* (2006.01)
(Continued)

(52) U.S. Cl.
CPC ............ *G01J 1/0429* (2013.01); *G01J 1/42* (2013.01); *G01J 3/0224* (2013.01); *G01J 3/18* (2013.01);
(Continued)

(58) Field of Classification Search
CPC .......... G01J 3/2823; G01J 3/0224; G01J 4/04; G01J 1/0429
See application file for complete search history.

(56) References Cited

U.S. PATENT DOCUMENTS 5,751,384 A * 5/1998 Sharp .................. G02B 27/288
348/E5.133
6,183,091 B1 * 2/2001 Johnson ............... G02B 27/283
349/9

(Continued)

FOREIGN PATENT DOCUMENTS

EP 2428830 A1 3/2012

OTHER PUBLICATIONS

Kim et al., "Snapshot Imaging Spectropolarimeter Utilizing Polarization Gratings", Proceedings of SPIE, Jan. 1, 2008 (Jan. 1, 2008), p. 708603, p. 4: Paragraphs 2, 3, Figure 4.

(Continued)

*Primary Examiner* — Kara E Geisel
*Assistant Examiner* — Dominic J Bologna
(74) *Attorney, Agent, or Firm* — Lando & Anastasi, LLP

(57) ABSTRACT

A programmable multifunction spectral and/or polarization imager. In one example, such an imager includes an imaging optical subsystem configured to receive electromagnetic radiation from a distant scene, a focal plane array configured to produce an image of the scene, and a programmable polarimetry subsystem electrically switchable between an ON state in which the polarimetry subsystem receives the electromagnetic radiation and provides polarized electromagnetic radiation to the focal plane array, and an OFF state in which the polarimetry system is configured as a first substantially clear aperture that passes the electromagnetic radiation to the focal plane array. In certain examples, the imager includes a programmable spectral imaging subsystem configurable between an ON state and an OFF state.

11 Claims, 4 Drawing Sheets

(51) Int. Cl.
*G01J 3/02* (2006.01)
*G01J 1/42* (2006.01)
*G01J 3/28* (2006.01)
*G01J 3/18* (2006.01)
*G01J 4/04* (2006.01)

(52) U.S. Cl.
CPC ............... *G01J 3/2823* (2013.01); *G01J 4/04* (2013.01); *G02F 1/13473* (2013.01)

(56) References Cited

U.S. PATENT DOCUMENTS

| | | | | |
|---|---|---|---|---|
| 6,419,362 | B1* | 7/2002 | Ikeda | G03B 21/006 349/9 |
| 6,519,040 | B1* | 2/2003 | Amos | G01J 3/4537 356/453 |
| 6,831,706 | B2* | 12/2004 | Abe | G02B 27/1026 348/E5.141 |
| 6,952,010 | B2* | 10/2005 | Nizani | G02B 6/29361 250/216 |
| 7,116,419 | B1* | 10/2006 | Weiner | G01J 3/447 356/364 |
| 8,130,378 | B2* | 3/2012 | Wu | G01N 21/21 356/364 |
| 2007/0126991 | A1* | 6/2007 | Fujita | H04N 9/3105 353/81 |
| 2010/0149533 | A1* | 6/2010 | Fest | G01J 4/00 356/367 |
| 2012/0069421 | A1* | 3/2012 | Fu | G01J 3/0205 359/290 |

OTHER PUBLICATIONS

Wu et al., "Liquid-Crystal-Based Switchable Polarizers for Sensor Protection", Applied Optics, Optical Society of America, Washington, DC, vol. 34, No. 31, Nov. 1, 1995 (Nov. 1, 1995), pp. 7221-7227, p. 7222, Paragraph 2-Paragraph 3, figure 1.

* cited by examiner

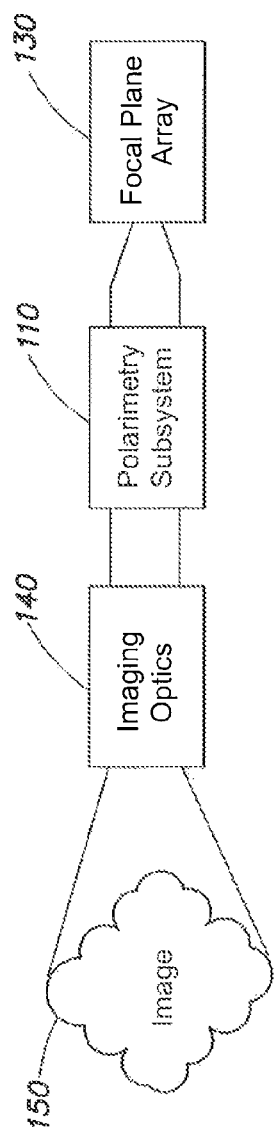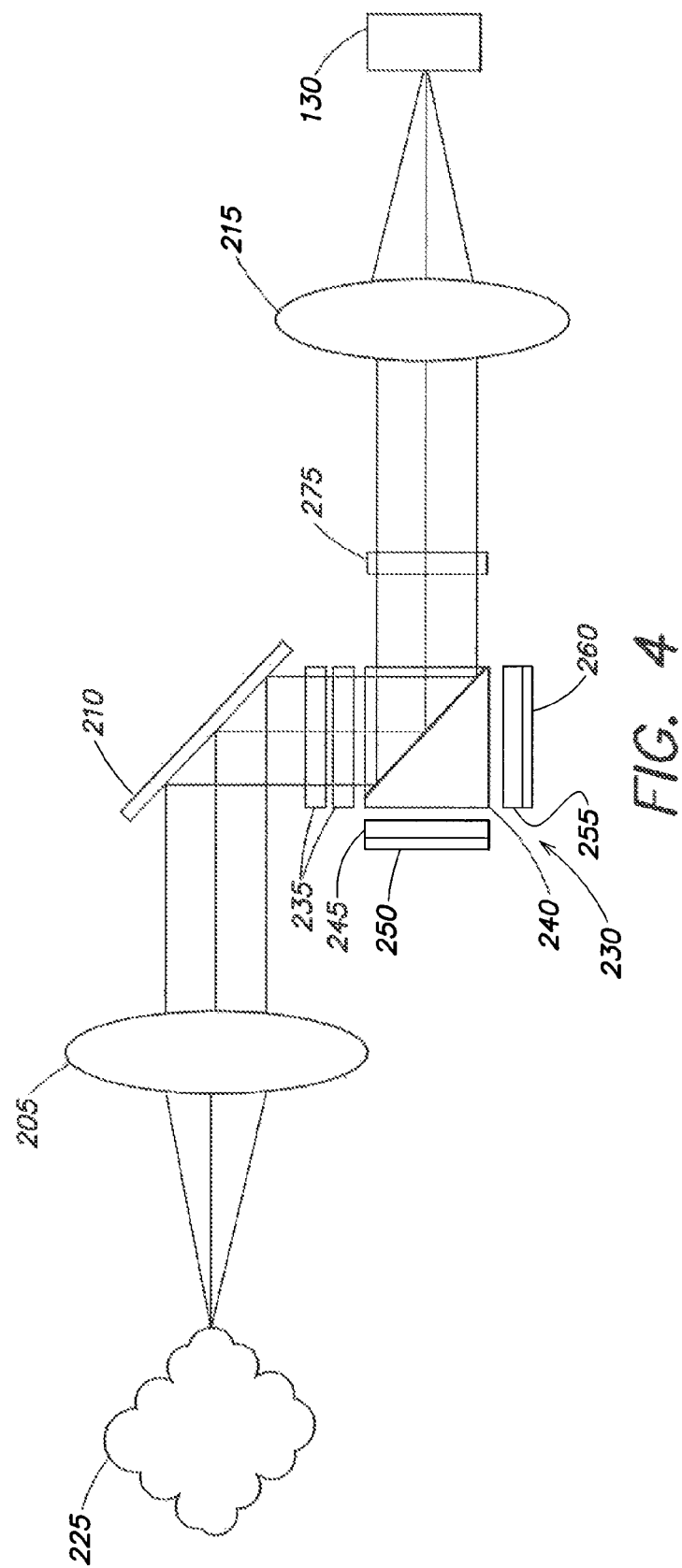

MULTIFUNCTION IMAGER

CROSS-REFERENCE TO RELATED APPLICATIONS

This application claims priority to and the benefit of U.S. Provisional Application No. 61/915,652 titled "MULTIFUNCTION IMAGER" and filed on Dec. 13, 2013, which is herein incorporated by reference in its entirety for all purposes.

BACKGROUND

There are a variety of types of imagers or cameras. Conventional digital cameras capture the spatial distribution of intensity and color in a scene, usually using a detector that includes a two dimensional array of pixels, such as a focal plane array (FPA), for example.

A "polarimetric imager" or "polarimeter" is a camera capable of viewing a scene in polarized light. The end result is detection and analysis of the polarization state of light reflected from an object, which is sensitive to the object orientation, composition, and surface roughness. Manmade objects tend to have highly polarized returns, whereas natural objects more often do not, and this has proven to be a useful discriminator for identifying hidden manmade objects, such as vehicles hidden in foliage, for example. The polarization in which the image is viewed is preferably selectable, and the spatial variations of the polarization state of an image are captured on a pixel-by-pixel basis.

Data collected from a polarimeter can be arranged as a three dimensional data cube of intensities for two special dimensions and, conceptually, one polarization dimension, I(x, y, p). In actuality the polarization state is a four dimensional vector, and the "p" axis comprises just four values. Intensities at each pixel in a two dimensional spatial grid may be recorded time sequentially for a sufficient number of polarization states to span the polarization space, such as the components of the four-dimensional Stokes vector that completely specifies a polarization field as unpolarized, partially polarized, or arbitrarily polarized. Polarimeters are inherently computational imagers. Data is collected (as the data cube) and processed by tomographic techniques to present images with polarization state contours. Once the data cube is known, an image in any arbitrary polarization can then be reconstructed. Alternatively, the same data can be post-processed to give the complex polarization factor for the light reflected off or emitted from the target scene, pixel by pixel.

Conventional polarimeters use multiple rotating polarization elements (polarizers, phase retarders, or filters) to map out the complete state of polarization for a scene through a time sequenced series of exposures and subsequent post processing. Such instruments are not fast enough to image moving targets or stationary targets from moving platforms.

Another type of polarimeter is known as a "snapshot" polarimeter, wherein all the polarization data for all of the image pixels is collected with a single exposure, and without the use of rotating or scanning components. On example of a snapshot polarimeter includes a fixed array of miniature polarizers affixed directly to a focal plane array. Three orientations of the polarizers are provided to sample the first three of the four Stokes vector components. Information on circular polarization is not collected. Four pixels of the FPA are used to represent a single pixel of the polarization image. More recently, there have been developments in polarimeters that can capture the full Stokes vector with a single measurement using spatial multiplexing and complex processing. Although complete polarization information may be acquired from a single exposure of the detector array, the limited bandwidth of the spatial modulation used to recover the polarization information may limit measurement accuracy, and the processing time required is substantial.

A spectral imager collects spatial and spectral data from a scene, with an object data cube comprising intensities for a range of wavelengths at each spatial coordinate, I(x, y, λ). Spectral information is obtained by dispersing the input light with gratings or prisms onto a detector array. Data collection generally requires scanning in at least one dimension, owing to the two dimensional nature of the focal plane array, and the three dimensional nature of the object data cube. Spectral imagers typically use a "push broom" data collection system, whereby the image is sampled by a slit and projected onto a prism, the prism dispersing the slit beam to cover the focal plane array. The spectra are collected as column vectors on the focal plane array, one column for each pixel of a single spatial dimension (x, λ). The process is repeated by moving the slit across the image, collecting one frame for each pixel of the second spatial row of dimension, y. The end result is a sequence of one-dimensional spectral images (x, λ), the number of images being equal to the focal plane array pixel count for the second dimension. Such a spectral imager is inherently a computational optics system; an image is not available until all the data have been collected and processed. Generally a two-dimensional image in any spectral component can be reconstructed from the data cube by computed tomography techniques. Such spectral imaging is widely used for remote sensing. Other scanning techniques used include whiskbroom, rotating filter wheels, and rotating prisms. Fourier transform imaging spectrometers mechanically scan the optical path length difference of an interferometer, thereby providing a spatial modulation that allows the polarization information to be separated. In each case scanning limits the data acquisition speed such that only static images can be reasonably collected from static platforms.

As with polarimeters, recent developments in spectral imagers have produced single snapshot (non-scanning) spectral imagers, whereby the entire data cube is collected in a single exposure, with no moving parts. One example of a snapshot spectral imager is the computer tomography imaging spectrometer (CTIS). The CTIS uses a computer-generated hologram as the disperser, and tomographic processing is used to recover the spectrum at each image pixel. The processing time for CTIS instruments is still relatively long, and there is a need for an oversized FPA to collect all of the diffraction orders simultaneously. Furthermore, image reconstitution suffers from incomplete sampling of the data cube that is inherent to the limited range of diffraction angles (the missing cone problem).

A polarimetric spectral imager is a relatively new class of imagers that can collect spectral data from a scene as viewed in any arbitrary polarization. The data cube of a polarimetric spectral imager is a four-dimensional volume comprising two spatial coordinates, wavelength, and polarization p, usually represented by the Stokes vector components: I(x, y,λ,p). Conventionally, the so-called spectropolarimetric hypercube has been measured by consecutively scanning wavelength for each of the four Stokes vector components, which is a time consuming operation.

SUMMARY OF THE INVENTION

Aspects and embodiments are directed to a multifunction optical imaging system that can be operated as a conventional digital camera, an imaging optical polarimeter, a spectral imager, or a polarimetric spectral imager, or any combination thereof. Conventional imagers perform these functions separately, or at best in combinations of two. Furthermore, conventional imagers lack the capability to electrically turn off selected functionality, as is achieved by aspects and embodiments of the present invention.

According to one embodiment, a multifunction imager comprises an imaging optical subsystem configured to receive electromagnetic radiation from a distant scene, a focal plane array configured to produce an image of the scene, and a programmable polarimetry subsystem electrically switchable between an ON state in which the polarimetry subsystem receives the electromagnetic radiation and provides polarized electromagnetic radiation to the focal plane array, and an OFF state in which the polarimetry system is configured as a first substantially clear aperture that passes the electromagnetic radiation to the focal plane array. In one example, the programmable polarimetry subsystem comprises at least two switchable phase retarders, and a linear polarizer. In one example, the linear polarizer comprises a polarizing beam splitting cube having an input face, a first face adjacent the input face, a second face opposite to the input face, and an output face adjacent to the input face and opposite the first face, the polarizing beam splitting cube configured to receive the electromagnetic radiation via the input face, an achromatic quarter-wave plate disposed adjacent the first face, a first mirror disposed outwardly from the achromatic quarter-wave plate, a switchable quarter-wave plate disposed adjacent the second face, and a second minor disposed outwardly from the switchable quarter-wave plate. The at least two switchable phase retarders may be liquid crystal cells, such as polymer dispersed nematic liquid crystals, for example. The multifunction imager may further comprise a spectral imager optically coupled to the polarimetry subsystem and the focal plane array. In another example the multifunction imager further comprises a programmable spectral imaging subsystem optically coupled to the polarimetry subsystem and the focal plane array, the spectral imaging system including an electrically switchable disperser configurable between an ON state in which the disperser spectrally disperses incident electromagnetic radiation to provide spectrally dispersed electromagnetic radiation to the focal plane array, and an OFF state in which the disperser is configured as a second substantially clear aperture. In one example, the electrically switchable disperser includes an optical phased array. In another example, the electrically switchable disperser includes a voltage-controlled MEMS grating. In another example, the electrically switchable disperser includes a first passive polarization grating, a second passive polarization grating, and a switchable half-wave plate positioned between the first and second passive polarization gratings. In one example, the programmable spectral imaging subsystem further comprises a switchable quarter-wave plate positioned between the polarimetry subsystem and the electrically switchable disperser. In another example, the imaging optical subsystem comprises an objective configured to receive the electromagnetic radiation and to direct the electromagnetic radiation to the programmable polarimetry subsystem, and reimaging optics configured to focus the electromagnetic radiation and the polarized electromagnetic radiation onto the focal plane array. In one example, the focal plane array is a dual-band focal plane array configured to image visible and infrared electromagnetic radiation.

According to another embodiment, a multifunction imager comprises an imaging optical subsystem configured to receive electromagnetic radiation from a distant scene, a focal plane array configured to produce an image of the scene, and a programmable spectral imaging subsystem optically coupled to the polarimetry subsystem and the focal plane array, the spectral imaging system including an electrically switchable disperser configurable between an ON state in which the disperser spectrally disperses incident electromagnetic radiation to provide spectrally dispersed electromagnetic radiation to the focal plane array, and an OFF state in which the disperser is configured as a first substantially clear aperture that passes the electromagnetic radiation to the focal plane array.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a block diagram of one example of a combination polarimeter and camera multifunction imager according to aspects of the invention;

FIG. 4 is a block diagram illustrating examples of the subsystems of the multifunction imager of FIG. 3, according to aspects of the invention;

DETAILED DESCRIPTION

Although polarimetric and spectral imagers are known, conventional devices cannot be operated independently as polarimeters or spectral imagers, and nor can they be reduced to a camera mode for operation in low light situations. Additionally, when two or more instruments are used to provide the different functions, there are registration errors between images captured by the different instruments.

Aspects and embodiments are directed to implementing the polarizing components of a polarimeter and the dispersing elements of a spectral imager such that each function can be independently turned off, rendering the respective optical train a clear aperture. This arrangement enables cascading the polarimeter, spectral imager, and camera in a common optical train, and programmably selecting which of the functions is to be operative at any given time. With the ability to independently turn on and off the polarimetry and spectral dispersing functions with programmable components, the instrument may be used to collect spatial information only (camera), polarization data only (polarimeter), spectral data only (spectral imager), or any combination of these functions. Thus, the functions of polarimetry, spectral imaging, and intensity imaging may be combined in a single instrument such that the various functions can be independently and programmably selected in arbitrary combinations. Embodiments of a multifunction imager disclosed herein may collect all of the information available in a light field and form corresponding images on the same detector array. Thus, problems of registration between multiple instruments are obviated.

Although the term "multifunction" may be used in the art to describe multi-band imagers, as used herein the term "multifunction" refers to an imager, or camera, capable of producing multiple kinds of images, namely, intensity, spectral, and/or polarization images.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
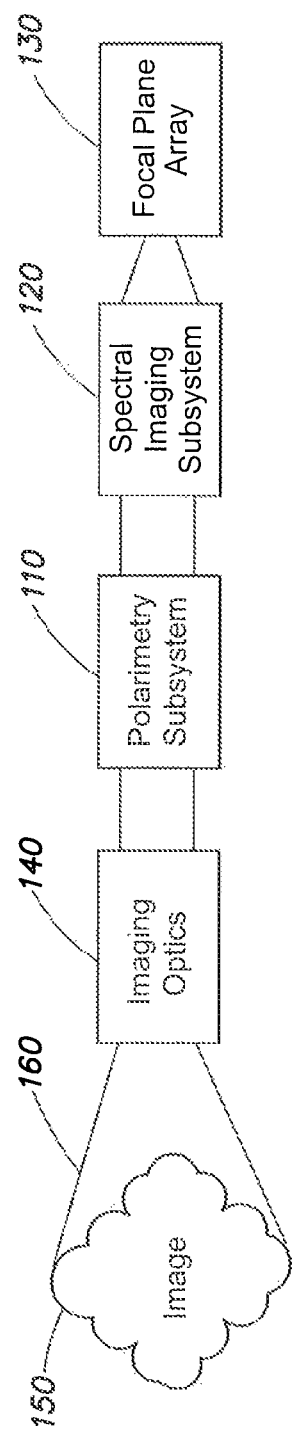
FIG. 1 is a block diagram of one example of a multifunction imager according to aspects of the invention.

Referring to FIG. 1, there is illustrated a block diagram of one example of a multifunction imager including a polarimetry subsystem 110, a spectral imaging subsystem 120, and a focal plane array 130 for spatially recording intensities. The imager further includes imaging optics 140 configured to receive a light field 160 representative of an image 150 of a distant scene, to direct the incoming light field to the various imaging subsystems, and to focus the light field onto the focal plane array 130. As discussed in more detail below, the polarimetry and spectral imaging subsystems 110, 120 are configured to be either active or switched to a transparent mode wherein the subsystem acts as a clear aperture and does not significantly affect the incoming light field. Thus the multifunction imager may be used as a digital camera, with both the polarimetry and the spectral imaging subsystems 110, 120 turned off; as a polarimeter alone; as a spectral imager alone; or as a polarimetric spectral imager.

Figure 2:
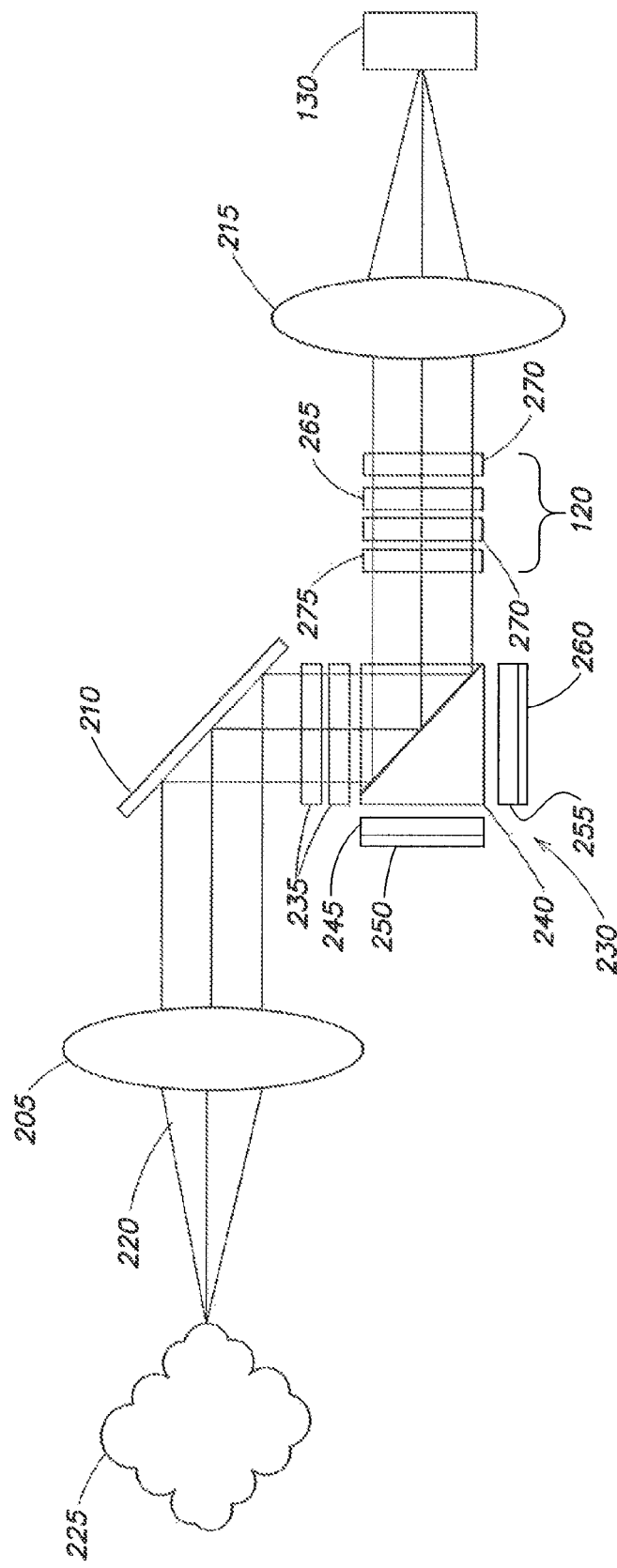
FIG. 2 is a block diagram illustrating examples of the subsystems of the multifunction imager of FIG. 1, according to aspects of the invention.

FIG. 2 expands the block diagram of FIG. 1 to illustrate examples of componentry that may be used to implement a multifunction imager according to certain embodiments. In the example illustrated in FIG. 2, the imaging optics 140 of FIG. 1 includes an objective 205, a minor 210, and reimaging optics 215. The objective 205 receives an incoming light field 220 from a scene 225 to be imaged, and directs the light field to the mirror 210. The minor 210 reflects the light field to the polarimetry subsystem 110 and the spectral imaging subsystem 120. The reimaging optics 215 focus the light field onto the focal plane array 130 for imaging. In the example illustrated in FIG. 2, the programmable polarimetry subsystem 110 of FIG. 1 includes a programmable linear polarizer 230. Various examples and embodiments of programmable linear polarizers 230 are discussed below. According to certain embodiments, the spectral imaging subsystem 120 may include switchable dispersers that may be used with scanning type spectral imagers, including, for example, the use of an optical phased array as the dispersive element. In other embodiments, the spectral imager subsystem 120 may be of the snapshot type, in which case this subsystem may have no scanners or other moving parts, as discussed further below.

There are various embodiments of the polarimetry subsystem 110 which may provide an optical subsystem that can be attached to the front of a spectral imager 120 or focal plane array 130 and provide the polarization discrimination required for operation as a polarimeter, while also being configured to be electrically disabled so as to act as a clear aperture when polarimetry data is not desired. Certain embodiments of the polarimetry subsystem 110 include a polarization converter, which converts an input light field to a specified polarization for processing, and a switchable polarizer. Two embodiments of a polarization converter are discussed below, along with examples of a switchable polarizer that can be used with either polarization converter.

Referring to FIG. 2, according to one embodiment, the polarimetry subsystem 110 includes a polarization converter that comprises two or three switchable phase retarders 235 and a linear polarizer 230. In the example illustrated in FIG. 2, there are two switchable phase retarders 235 shown; however for a three-retarder design another retarder may be added to the two shown between the mirror 210 and the linear polarizer 230, while all else may remain unchanged. In one example, the linear polarizer 230 includes a polarizing beam splitting cube 240.

Table 1 below provides fast axis (FA) orientations and retardances for each phase retarder 235 for an example of a three-retarder configuration. In the example shown in Table 1, the linear polarizer 230 is assumed to be "ON" and oriented to pass horizontal polarization and reject vertical polarization. The left-most column of Table 1 identifies the polarization basis chosen for each of the three sets of retarder configurations shown. In the example corresponding to Table 1, the three phase retarders 235 include two half-wave plates (HWP1 and HWP2) and a quarter-wave plate (QWP). For this example of the polarization converter, the phase retarders 235 are either ON or OFF. The phase retarders 235 have fixed orientation and retardances that may be switched with applied voltage between zero and a maximum setting determined by the cell construction, for example, 90° for a quarter wave plate (QWP) and 180° for a half wave plate (HWP). In this example, there are no moving parts in the polarization converter. The input light field is from the left and may be polarized or unpolarized.

With reference to Table 1, the transformations of three pairs of orthogonal polarizations are tracked as the beam progresses element by element through the optical train of FIG. 2 (modified to include a third phase retarder 235, as discussed above). For each sampling basis one and only one polarization state is converted to horizontal polarization and is passed by the linear polarizer 230; that is the polarization state for which the scene 225 is observed. Those skilled in the art will appreciate, given the benefit of this disclosure, that the polarimetry subsystem 110 may alternatively be configured to make the final measurement in other basis states, such as vertical; however, there is no loss in generality by selecting horizontal as the measurement basis.

Still referring to Table 1, the retarder phase states shown are for the six polarization measurements which may be taken to uniquely characterize an arbitrary complex polarization field by its Stokes vector S, where S is a four component normalized vector: ($S_0$, $S_1$, $S_2$, $S_3$). $S_0$ is the total intensity of the light beam, $S_1$ is the intensity difference between the horizontal and vertical polarization components, $S_2$ is the intensity difference between the polarization components along ±45°, and $S_3$ is the intensity difference between the right and left circularly polarized components (RCP and LCP). For polarized light, $S_0$ is the sum of the two measurements for any of the three sampling configurations shown; i.e., the sum of the horizontal and vertical (H+V) intensities, or the +45° and −45° intensities, or the RCP and LCP intensities. If all of the polarizing elements are turned OFF, the input polarization state propagates unchanged through the optical train. Thus, the polarimeter subsystem 110 is effectively reduced to a clear aperture.

240, for which losses are typically only a fraction of a percent for the preferred polarization. The linear polarizer 230 may be oriented to pass either horizontal or vertical polarization, and the orientation may be selected based on the configuration of the phase retarders 235. For minimum throughput loss for a beam splitting polarizer it should be oriented to pass the so-called "s" polarization component that is perpendicular to the plane of incidence of a thin-film interface, typically coated onto the hypotenuse of one of the two 45° prisms used to construct the cube. Throughputs for this orientation are generally about 99.5% for commercially available polarizers, and are quite broadband.

As discussed above, according to certain embodiments the linear polarizer 230 is switchable, such that the linear polarizer can be turned ON and OFF. In one example, the polarizer 230 is optically clear when OFF, and a polarizer with high extinction coefficient when turned ON. Referring again to FIG. 2, in one embodiment, the linear polarizer includes the polarizing beam splitter cube 240 with an achromatic quarter wave plate 245 and a first minor 250 attached to a face adjacent the input, and a switchable quarter wave plate 255 and a second minor 260 attached to the face opposite the input. The other adjacent face is the output, as shown in FIG. 2. When the switchable quarter

TABLE 1

| | Input Polarization | HWP1 FA at 45° (90° Rot) | | HWP2 FA at 22.5° (45° Rot) | | QWP FA at 45° | Lin Pol Passes H | Output Polarization |
|---|---|---|---|---|---|---|---|---|
| Samples H | H | Off | H | Off | H | Off | H | H |
| | V | | V | | V | | V | 0 |
| | H | On | V | Off | V | Off | V | 0 |
| Samples V | V | | H | | H | | H | H |
| Samples 45 | 45 | Off | 45 | On | H | Off | H | H |
| | −45 | | −45 | | V | | V | 0 |
| | 45 | On | −45 | On | V | Off | V | 0 |
| Samples −45 | −45 | | 45 | | H | | H | H |
| Samples RCP | RCP | Off | RCP | Off | RCP | On | H | H |
| | LCP | | LCP | | LCP | | V | 0 |
| | RCP | On | LCP | Off | LCP | On | V | 0 |
| Samples LCP | LCP | | RCP | | RCP | | H | H |

According to one embodiment, the switchable phase retarders 235 are liquid crystal cells with substrates prepared to provide quiescent alignment of the liquid crystal molecules, and cell thickness chosen such that with no voltage applied they have the nominal retardance desired, here 90° or 180°. The liquid crystal cells may be provided with transparent conducting thin films on the inner surfaces of the two substrates comprising the cell. With a sufficient applied voltage, for example, approximately 10 volts for conventional nematic liquid crystals, the liquid crystal molecules reorient such that the retardance is reduced to zero. For faster switching cells, polymer dispersed nematic liquid crystals may be used. These polymer dispersed nematic liquid crystal cells generally operate with higher applied voltages, for example, approximately 100 volts. Switchable retarders suitable for implementation of certain embodiments are commercially available in the visible and near infrared bands from Meadowlark Optics of Frederick, Colo. In other examples, the switchable phase retarders 235 may be implemented using bulk electro-optic retarders, as are well known in the art.

According to one embodiment, the linear polarizer 230 may preferably have low losses for the transmitted polarization. As discussed above, in one example, the linear polarizer 230 may include a polarizing beam splitting cube wave plate 255 is ON, the polarizing beam splitting cube 240 operates as a high quality polarizer. When the switchable quarter wave plate 255 is OFF, the polarizing beam splitting cube 240 operates as a clear path from input to output, meaning that it passes all polarizations, such that substantially all of the input irradiance gets transmitted through to the spectral imaging subsystem 120, irrespective of the settings of the phase retarders 230.

In this embodiment, when the linear polarizer 230 is operative, the orthogonal component of the sampled polarization state is deflected into an absorber and lost. Although this operation results in a 3 dB loss of incident scene intensity, such losses are the minimum achievable when observing a randomly polarized natural scene in a specific polarization state. In naturally random polarized light, one half of the intensity is horizontally polarized, and the optical train of FIG. 2 collects and measures substantially all of that intensity. At least due to the minimum 3 dB loss associated with a polarimeter, it is advantageous to be able to turn off the polarimeter functions and operate in the camera or spectral imaging modes with the full range of (unpolarized) input light, which pass unimpeded through the linear polarizer 230 in the OFF state.

Furthermore, compared with a conventional scanning spectral polarimeter or a computer tomographic imaging spectral polarimeter (CTISP), embodiments of the programmable polarimetry subsystem 110 discussed above are relatively fast. Although six measurements may be required to extract full polarization information from the scene 225, these measurements can be made very rapidly. For example, the switchable quarter-wave plate 255 may be implemented using a polymer network liquid crystal wave plate, which can be made to switch in about 25 to 50 μs, at least in the visible and near-infrared spectral bands. Consequently, in practice the measurement times in these bands may be limited by the focal plane array frame rate rather than the reconfiguration time for the polarimetry subsystem 110. Additionally, there is no mechanical scanning delay. With a high speed focal plane array readout, the six measurements may be made fast enough to sustain a 30 or 60 Hz equivalent frame rate for the polarimetry subsystem 110.

As discussed above, an alternative embodiment the above-discussed polarimetry subsystem 110 may have an optical train comprising only phase retarder two wave plates (rather than three as in the example of Table 1) in fixed orientations, with an analog range of electrically adjustable retardances, and the linear polarizer 230, as illustrated in FIG. 2. In this case the voltages to the two phase retarders 235 may be adjusted, for example, using a look up table, to provide the specific pair of retardances needed to convert an arbitrary polarization into a fixed reference polarization state, such as the horizontal polarization used as the sample reference in Table 1. The retarder settings follow directly from the description of an arbitrary polarization state P by the orientation angle of the major axis, $\psi$, and its ellipticity, $\epsilon$. A first wave plate with retardance $\psi$ and fast axis along the horizontal direction converts the state P into an elliptically polarized state with the same ellipticity but oriented with its major axis along the horizontal direction. A second wave plate with retardance $\chi$ and fast axis at 45° to the horizontal direction then converts this intermediate polarization state into horizontal polarization, where $\chi$ is the so-called ellipticity angle, defined by tan $\chi$=$\epsilon$. If the parameters of the polarization state are only known in terms of its complex polarization factor R, with magnitude r, and phase $\delta$, conversion to the ($\psi$, $\epsilon$) representation is as follows:

$$\tan 2\psi = \frac{2r}{(1-r^2)}\cos\delta$$

$$\sin 2\chi = \frac{2r}{(1-r^2)}\sin\delta$$

In the above equations, $\epsilon$=tan $\chi$. Similar equations are available for the reverse conversion. Those skilled in the art will appreciate, given the benefit of the present disclosure, that no iteration is required for determining the retarder settings. In addition, this configuration, operated in reverse, converts horizontal polarization into the arbitrary polarization state P, that state being uniquely specified by the retardances of the two wave plates 235.

According to one embodiment of a two-wave-plate polarimetry subsystem 110, the wave plates (phase retarders 235) are operated in an analog mode, calibrated for phase as a function of voltage, and the data stored as a look up table. This is standard operating procedure for optical phased arrays, which are electrically similar to these wave plates. Electrical drivers and software exist to adjust the phase with a precision of approximately λ/1000, which is well in excess of the precision needed for typical imaging applications. The phase retarders 235 for the two-wave-plate polarization converter may be the same design as used for a three-wave-plate polarization converter. However, the phase retarders are operated differently; for the two-wave-plate configuration using a look up table for analog retardances that are calculated from knowledge of the desired polarization state. The switchable linear polarizer 230 may be the same as that for the three-wave-plate configuration.

Wave-plate-based phase retarders may be relatively wavelength-dependent, with the phase shift varying inversely with wavelength for a single cell. However, achromatic versions of liquid crystal phase retarders may be implemented using multiple layer devices. For example, a homeotropically aligned liquid crystal quarter-wave plate with normal incidence extinction ratio of 10,000:1 and nearly 100% transmission across the visible band for the OFF state is known in the art. Such properties may allow the switchable polarizer of the polarimetry subsystem 110 of a multifunction imager to be highly transparent when OFF and highly polarizing when ON. Additionally, a switchable half-wave plate with achromatic response over the 400-700 nm wavelength range is known in the art. If wider band coverage is needed than can be obtained with achromatic retarders, the input light field may be pre-filtered, dividing it into narrower bands. Each band may be processed separately. For each such sub-band, the wave-plates may be electrically reprogrammed to re-optimize performance in that band. In this case the full band performance may be pieced together using a computer such as is used to process hyperspectral images.

According to one embodiment, a multifunction imager may include a programmable polarimetry subsystem 110, such as any of the embodiments and examples discussed above, combined with a conventional spectral imager. Thus, a polarimetry subsystem 110 can be configured to be attached to the front of any of a wide variety of spectral imagers and convert the combination into a combination polarimetric spectral imager. Spectral images may be constructed in any arbitrary polarization with software programming that may or may not be coordinated with the spectral imaging software. With this configuration, the polarimeter can be turned off, leaving the spectral imaging functions unaltered and its sensitivity to unpolarized light unchanged. This is in contrast to conventional polarimetric spectral imagers wherein the polarization discrimination functions result in the spectral imager having polarized input, meaning that one half of the irradiance of an unpolarized scene has been lost.

As discussed above, in other embodiments, it may be desirable for full flexibility that the multifunction camera include a spectral imager for which the dispersing element can be turned off and the scanning means (if used) disabled, optionally with any slits removed. Embodiments of a multifunction imager with a programmable spectral imaging subsystem 120 may use a programmable scanning spectral imager, or a programmable snapshot spectral imager, several of examples of which are discussed in more detail below.

Conventional scanning spectral imagers use wavelength dispersers having fixed dispersion, such as conventional gratings or prisms. According to one embodiment, the programmable spectral imaging subsystem 120 may replace the fixed disperser of a conventional spectral imager with an optical phased array. An optical phased array is a programmable grating that can be turned off, leaving the device as an essentially clear aperture.

For both prisms and gratings, angular dispersion (rate of change of angle with wavelength, $d\theta/d\lambda$) is roughly proportional to the angle of deviation or the diffracted angle, respectively, and the maximum steering angles for optical phased arrays are considerably smaller than the deviation angles from typical prisms as used in spectral imagers. However, optical phase arrays may have larger angular dispersion than prisms. Dispersion for a grating (OPA) is, to first order, $d\theta/d\lambda=1/\Lambda$, where $\Lambda$ is the grating period. Angular dispersion for a prism is, to first order, $d\theta/d\lambda=\alpha \, dn/d\lambda$, where $\alpha$ is the prism deviation angle and $dn/d\lambda$ represents the refractive index dispersion. Optical phased arrays have been demonstrated with a maximum steering angle of up to about 10°, corresponding to an angular dispersion of approximately 125 mrad/micron. For comparison, a 45° deviation prism of zinc selenide (ZnS), which is fairly high dispersion material at 1 micron wavelength, has an angular dispersion of about 40 mrad/micron. Optical phased arrays may typically have a maximum steering angle of about 2° and a corresponding angular dispersion of about 25 mrad/micron, which is comparable to that of the above prism example. Accordingly, based on dispersion characteristics, optical phased arrays may be used as replacements for fixed prisms in spectral imagers, as these devices may provide comparable or even larger levels of dispersion.

Optical phased arrays are polarization sensitive. An optical phased array steers linearly polarized light of a preferred direction and does not steer the orthogonal polarization. In certain embodiments of the spectral imaging subsystem 120, it may be desirable that the dispersive element is not polarization sensitive. Accordingly, in one example, the spectral imaging subsystem 120 may include a cascaded pair of orthogonal optical phased arrays for polarization insensitivity. In such examples, the net polarization sensitivity may be less than that for conventional prisms or gratings.

The use of an optical phased array for the dispersive element of a programmable spectral imaging subsystem 120 may offer an additional advantage of allowing higher order diffraction modes to be distinguished from the primary order. For conventional fixed grating spectrometers the free spectral range is often limited to avoid higher orders which cannot be distinguished from the primary order. However in the case of an optical phased array the diffracted angles can be programmably changed, thereby moving the overlaps of the higher order lobes and allowing them to be distinguished; the higher orders move faster than the primary order as the grating angle is changed.

According to another embodiment, a programmable spectral imaging subsystem 120 includes a MEMS grating that is used as a switchable disperser for a spectral imager. In one example, the MEMS grating is a voltage-controlled amplitude grating, wherein the periodicity is provided by microfabricated parallel striped electrodes that are raised slightly above the substrate. When a voltage is applied, the electrodes are pulled down to the substrate and the periodic amplitude variations disappear, thereby turning the grating OFF. Thus by controlling the voltage applied to the MEMS grating, the dispersive function of the spectral imager may be turned ON, such that spectral imaging functionality is provided, or OFF, such that the spectral imaging subsystem 120 acts essentially as a clear aperture.

According to another embodiment, the dispersive element of a programmable spectral imaging subsystem 120 may be implemented using a switchable polarization grating. An electrically switchable polarization grating has periodic variations of polarization rather than intensity or phase, and as a result diffracts with very high efficiency. In one example, an electrically switchable polarization grating may be formed by holographically "writing" the grating structure in thin films of reactive mesogens on a substrate. The properties of switchable polarization gratings are considerably different than those of conventional Bragg or blazed gratings. For example, switchable polarization gratings are considerably more polarization sensitive. Switchable polarization gratings diffract either right- or left-handed circular polarization with high efficiency, and diffract almost none of the orthogonal polarization. Switchable polarization gratings have three diffraction orders, namely, the zero and the ±1 orders, and the efficiency of these diffracted orders is proportional to the Stokes vector components. As a result, a switchable polarization grating may be used to disperse in both wavelength and polarization. Although single polarization gratings have diffraction efficiency near unity over a smaller bandwidth than conventional Bragg or blazed gratings (for example, about ±25% of the center wavelength, compared to about ±50% of the center wavelength), two cascaded polarization gratings, fabricated with opposite twist, may be made nearly achromatic over a wide spectrum, with diffraction efficiencies >90% over the visible spectrum.

In one embodiment, a switchable polarization grating which may be sued for the disperser of the programmable spectral imaging subsystem 120 is implemented by forming the grating in a non-polymerized liquid crystal. The grating structure may be extinguished with application of a low (for example, 1-10 V) voltage, such that there is no diffraction for any input polarization in this OFF state.

Referring again to FIG. 2, in another embodiment, the programmable spectral imaging subsystem 120 may be implemented using a switchable half-wave plate 265 "sandwiched" between two identical passive polarization gratings 270. The spectral imaging subsystem 120 may further include a quarter-wave plate 275 positioned between the polarimetry subsystem 110 and the first passive polarization grating 270, as shown. The passive polarization gratings 270 are switched in diffraction direction through the use of the cascaded half-wave plate 265. Illuminated with right circular polarization, the passive grating 270 diffracts "upwards," and illuminated with left circular polarization the passive grating 270 diffracts "downward." Considering a circularly polarized input, when the switchable half-wave plate 265 is ON it changes the sense of the circular polarization incident on the second passive polarization grating 270, such that the direction of deflection adds to that of the first. When the switchable half-wave plate 265 is OFF, deflections from the two passive polarization gratings 270 cancel one another, and the disperser is effectively turned off.

The quarter-wave plate 275 may be used to supply a desired input polarization to the disperser. As discussed above, examples of the polarimetry subsystem 110 may sample an input light field and converts it into horizontal polarization. This horizontal polarization may be further converted to right or left circular polarization by the quarter-wave plate 275 positioned between the polarimeter and the disperser of the spectral imaging subsystem 120. The combination of the passive polarization gratings 270 and switchable half-wave plate 265 may replace the fixed grating or prism of a conventional spectral imager, and provide the desired ON-OFF switching capability for the spectral imaging functions, as discussed above.

The focal plane array 130 may be of the two-band type, such as a visible/near-infrared array. In such embodiments, the multifunction imager may provide multiple combinations of spectral imager and polarimeter functions in multiple bands, such as visible spectral imaging with a visible or near-infrared polarimetry capability, or a near-infrared polarimeter with visible or near-infrared spectral imaging capability. Additionally, when both the polarimetry subsystem 110 and spectral imaging subsystem 120 are turned off, the multifunction imager may function as a digital camera, providing intensity images in either or both of the visible and near-infrared spectral bands.

According to another embodiment, the spectral imaging subsystem 120 of a multifunction imager may incorporate a snapshot spectral imager rather than a scanning spectral imager. As discussed above, snapshot spectral imagers collect all of the information in a single frame, and then process to recover the image. Either optical phased arrays or polarization gratings may be used as switchable dispersers in embodiments of a snapshot spectral imager. With either optical phased arrays or switchable gratings as the disperser, the spectral imaging functions can be turned off, as is desired for embodiments of the multifunction imager, or the various subsets thereof that are discussed herein.

It may be generally desirable that spectral imagers and/or polarimeters may be used to sample an image over a broad range of wavelengths. In particular, many discriminating features are in the infrared bands. Accordingly, it may be desirable that the various components of a multifunction imager be achromatic over substantial wavelength ranges. Furthermore, for particular applications, it may be desirable that the components are operable over the wavelength bands usually used for surveillance and reconnaissance. Switchable polarization gratings and half-wave plates are operable in the visible and near-infrared spectral bands. Additionally, mid-wave and/or long-wave infrared versions of these devices may be implemented with appropriate material choices.

Referring to FIG. 3, certain embodiments are directed to a combination polarimeter and camera. In such embodiments, a multifunction imager may include the polarimetry subsystem 110, along with the imaging optics 140 and focal plane array 130. The polarimetry subsystem 110 includes a polarimeter that can be turned ON and OFF, as discussed above. When the polarimetry functions are OFF, the instrument operates as a conventional digital camera. When OFF, the polarimetry components do not significantly alter the polarization of the input light field; consequently, the focal plane array 130 is exposed to the full range of generally unpolarized reflections from the scene 225. This aspect may be particularly desirable for retaining the sensitivity of the camera for low light operation. When the polarimetry functions are ON, the instrument operates as a polarimeter that is perfectly co-registered with the camera; both subsystems use the same focal plane array 130. This configuration allows the combining of the functions of an optical polarimeter and an intensity imager (a camera) in a single instrument. Conventional polarimeters cannot function as a conventional digital camera.

FIG. 4 illustrates examples of certain components that may be used to implement the subsystems of embodiments of the multifunction imager of FIG. 3. Either two-retarder or three-retarder configurations may be used for the polarimetry subsystem 110, as discussed above. Either configuration may use the switchable linear polarizer 230 discussed above. The focal plane array 130 may be of the two-band type, such as a visible/near-infrared array. In this case, the instrument may provide multiple combinations of polarimetry and camera functions, such as visible polarimetry with a visible or near-infrared camera capability, or a near-infrared polarimeter with visible or near-infrared camera capability. A significant advantage of this instrument is the capability to rapidly switch from one mode of operation to another, thereby allowing the observer to quickly multiplex between polarimetry and intensity images that are perfectly co-registered.

Figure 5:
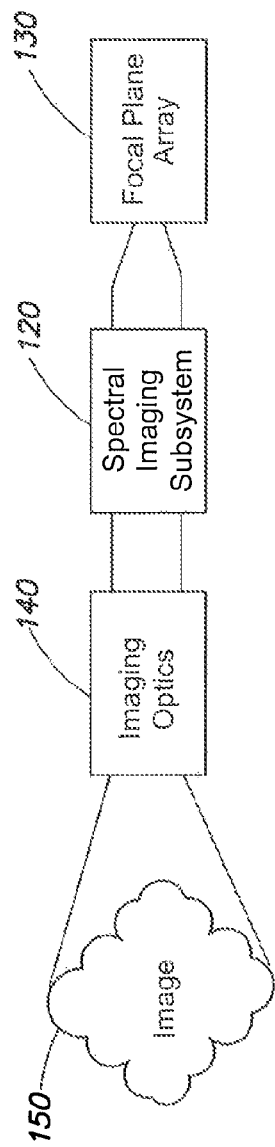
FIG. 5 is a block diagram of one example of a combination spectral imager and camera multifunction imager according to aspects of the invention.

Referring to FIG. 5, other embodiments are directed to a combination spectral imager and camera. In such embodiments, a multifunction imager may include the spectral imaging subsystem 120, along with the imaging optics 140 and focal plane array 130. As discussed above, the spectral imaging subsystem 120 is configured such that the dispersing functions can be turned off to convert the optical train of the spectral imager into an effectively clear aperture. The spectral imaging subsystem 120 may include any of the examples and embodiments discussed above, and may switchable polarization gratings or optical phased arrays as dispersers that can be programmably turned off. When the disperser is OFF, the instrument functions as a conventional digital camera. When the disperser is ON, the instrument functions as a spectral imager that is perfectly co-registered with the intensity images from the camera mode because both functions use the same focal plane array 130 and have the same optical train. Thus, the instrument can be used as a simple digital camera or as a spectral imager, with the images being formed on the same detector array. The combination solves the problem of image registration when multiple instruments are used to collect similar information and allows rapid sequencing between image modes so as to allow the operator to resolve image artifacts. In one embodiment, the focal plane array 130 may be of the two-band type, such as a visible/near-infrared array, in which case the instrument may provide multiple combinations of spectral imager and camera functions, such as visible spectral imaging with a visible or near-infrared camera capability, or a near-infrared spectral imager with visible or near-infrared camera capability.

Figure 6:
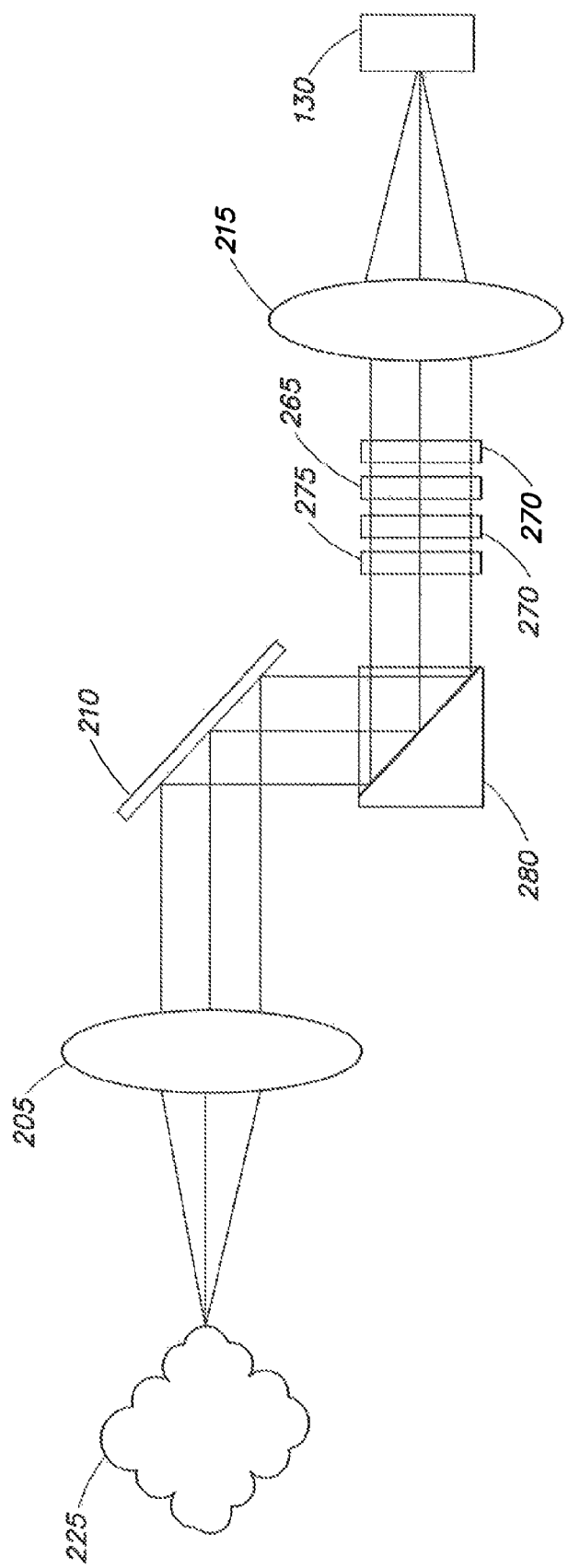
FIG. 6 is a block diagram of another example of a multifunction imager according to aspects of the invention.

Referring to FIG. 6, according to another embodiment, a multifunction imager may include a combination polarimeter and spectral imager in which the spectral imaging functions may be turned off. In this embodiment, the spectral imaging subsystem 120 is configured such that the dispersing functions can be turned off to convert the optical train of the spectral imager into an effectively clear aperture. The spectral imaging subsystem 120 may include any of the examples and embodiments discussed above, and may switchable polarization gratings or optical phased arrays as dispersers that can be programmably turned off. The multifunction imager further includes a polarizer 280, for example, a polarizing beam splitting cube. As discussed above, the quarter-wave plate 275 may be used to adjust the polarization of the light beam exiting the polarizer 280. In this configuration, when the disperser is ON, the instrument functions as a combined polarimeter and spectral imager. When the disperser is OFF, the instrument functions as a polarimeter. Thus, the instrument can be used as a polarimeter alone, or as a polarimetric spectral imager, with the images being formed on the same focal plane array 130.

Thus, aspects and embodiments provide various configurations of a multifunction imager capable of selectively providing polarimetry, spectral imaging, intensity imaging, or any combination of these functions.

According to certain embodiments, a multifunction imager is configured to effect the polarizing functions of the polarimeter with components that can be electrically turned off, thereby eliminating the polarimeter functions when so desired, and reducing the instrument to a common digital camera. When the polarimetry functions are turned off, the incoming light field is presented to the camera detector array without significant modification to the polarization, thereby allowing the intensity to be imaged with the full light field strength, which is important for low light situations. These embodiments may allow the rapid sequencing of images in polarimetry and intensity modes, thereby allowing image artifacts to be more easily resolved by the operator. According to certain embodiments, the dispersing functions of a spectral imager are implemented in ways that allow the dispersing function to be turned off, thereby reducing the spectral imaging optical train to the equivalent of a clear aperture, and reducing the instrumental functionality to that of a camera alone, or a polarimeter alone. In this way the functions can be programmably selected, as needed. As discussed above, certain embodiments provide a combination polarimeter/spectral imager in which the polarimeter functions can be turned off. In some examples, a switchable or programmable polarimeter may be implemented in combination with a conventional spectral imager. In other example, a switchable or programmable spectral imager may be implemented in combination with a conventional polarimeter. Although various examples of polarimetric spectral imagers are known in the art, conventional polarimetric imagers do not have the capability of turning off the polarization components to revert the instrument into a spectral imager, with commensurate higher throughput and faster processing speed. Furthermore, conventional polarimetric imagers do not have the capability to turn off the dispersing function to allow the system to be operated as a simple camera or as a polarimeter.

Thus aspects and embodiments of the multifunction imagers discussed herein may provide various imaging options and advantages not present in or provided by conventional devices. In particular, a single instrument may be used to capture all the features of light reflected from a scene, including recording the light spectrum at each pixel to provide spectral information, recording the polarization state of the light at each pixel to provide polarimetry information, and recording spatial intensity variations. According to certain embodiments, a fully programmable multifunction imager may allow an operator to selectively and independently enable or disable the polarimetry and/or spectral imaging functions, to reconfigure the instrument to provide desired image data. Rapid switching between different configurations may be provided in come examples through the use of fast programmable devices, such as programmable phase retarders 230, optical phased arrays, and switchable polarization gratings, as discussed above. The high switching speed may allow rapid sequencing between images formed from the various discriminating light features; namely, intensity, polarization, and spectrum. The ability to rapidly switch between imaging functions, and thereby obtain different images of the same object, may be advantageous for enhancing image recognition, particularly under non-ideal conditions, by allowing different "views" of the same image to be examined sequentially. For example, under poor light conditions, the camera mode may be used alone to allow maximal photon capture. Polarization, spectral, and conventional intensity images may be rapidly alternated to better distinguish object features.

The operational flexibility enabled by a multifunction imager is may add substantial value to existing applications for both polarimeters and spectral imagers. Having available in the same instrument the capability to measure any or all of the photometric parameters of light (intensity, polarization, and spectrum, as functions of space) may enhance reconnaissance, surveillance, and identification applications, for example. Furthermore, having all information collected on the same focal plane array detector obviates the otherwise persistent problem of spatial registration when separate instruments are used.

According to certain embodiments, having the ability to choose imaging functions in the same instrument may be particularly useful because the conditions for which conventional single-function imagers are most applicable are not the same. For example, as discussed above, conventional polarimetric spectral imagers are too slow to be used with moving targets, whereas digital cameras are regularly used for moving targets. Embodiments of the multifunction imager, operated as a polarimeter alone, may have essentially the same base frame rate as the focal plane array 130 alone, and may therefore be as suitable for imaging moving targets as is a focal plane array alone, such as in the camera mode. Similarly, embodiments of the multifunction imager, operated as a spectral imager alone, may have the frame rate of the spectral imaging system to which the polarization subsystem has been attached. Some spectral imagers are sufficiently fast to image slowly moving targets, in which case substantial image recognition capability accrues from being able to rapidly alternate between a conventional spatial image, its polarization version, and/or the spectral version of the same object. Additionally, the flexibility of the multifunction imager may allow collection of only the data needed, thereby potentially reducing the data collection time and the amount of data to be stored or transmitted, both being significant consideration with most remote sensing systems. For example, polarimetry data may be collected for only a selected subset of the scenes being imaged for which it may be expected to provide additional discrimination. When polarimetry data are not required, the polarimetry functions may be turned off, and the polarimeter subsystem does not substantially degrade the performance of the spectral imager.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multifunction imager comprising:
   an imaging optical subsystem configured to receive electromagnetic radiation from a distant scene;
   a focal plane array configured to produce an image of the scene; and
   a programmable polarimetry subsystem electrically switchable between an ON state in which the polarimetry subsystem receives the electromagnetic radiation and provides polarized electromagnetic radiation to the focal plane array, and an OFF state in which the polarimetry system is configured as a first substantially clear aperture that passes the electromagnetic radiation to the focal plane array, wherein the programmable polarimetry subsystem includes:
   a polarizing beam splitting cube having an input face, a first face adjacent the input face, a second face opposite to the input face, and an output face adjacent to the input face and opposite the first face, the polarizing beam splitting cube configured to receive the electromagnetic radiation via the input face;

three switchable phase retarders disposed adjacent to the input face;
an achromatic quarter-wave plate disposed adjacent the first face;
a first mirror disposed outwardly from the achromatic quarter-wave plate;
a first switchable quarter-wave plate disposed adjacent the second face; and
a second mirror disposed outwardly from the first switchable quarter-wave plate; and
a programmable spectral imaging subsystem optically coupled to the polarimetry subsystem and the focal plane array, the spectral imaging system including an electrically switchable disperser configurable between an ON state in which the disperser spectrally disperses incident electromagnetic radiation to provide spectrally dispersed electromagnetic radiation to the focal plane array, and an OFF state in which the disperser is configured as a second substantially clear aperture that passes the electromagnetic radiation to the focal plane array.

2. The multifunction imager of claim 1, wherein the at least two switchable phase retarders are liquid crystal cells.

3. The multifunction imager of claim 2, wherein the liquid crystal cells are polymer dispersed nematic liquid crystals.

4. The multifunction imager of claim 1, wherein the electrically switchable disperser includes an optical phased array.

5. The multifunction imager of claim 1, wherein the electrically switchable disperser includes a voltage-controlled MEMS grating.

6. The multifunction imager of claim 1, wherein the electrically switchable disperser includes:
a first passive polarization grating;
a second passive polarization grating; and
a switchable half-wave plate positioned between the first and second passive polarization gratings.

7. The multifunction imager of claim 6, wherein the programmable spectral imaging subsystem further comprises a second switchable quarter-wave plate positioned between the polarimetry subsystem and the electrically switchable disperser.

8. The multifunction imager of claim 1, wherein the imaging optical subsystem comprises:
an objective configured to receive the electromagnetic radiation and to direct the electromagnetic radiation to the programmable polarimetry subsystem; and
reimaging optics configured to focus the electromagnetic radiation and the polarized electromagnetic radiation onto the focal plane array.

9. The multifunction imager of claim 1, wherein the focal plane array is a dual-band focal plane array configured to image visible and infrared electromagnetic radiation.

10. A multifunction imager comprising:
an imaging optical subsystem configured to receive electromagnetic radiation from a distant scene;
a focal plane array configured to produce an image of the scene;
a programmable polarimetry subsystem electrically switchable between an ON state in which the polarimetry subsystem receives the electromagnetic radiation and provides polarized electromagnetic radiation to the focal plane array, and an OFF state in which the polarimetry system is configured as a first substantially clear aperture that passes the electromagnetic radiation to the focal plane array, wherein the programmable polarimetry subsystem includes:
a polarizing beam splitting cube having an input face, a first face adjacent the input face, a second face opposite to the input face, and an output face adjacent to the input face and opposite the first face, the polarizing beam splitting cube configured to receive the electromagnetic radiation via the input face;
at least two switchable phase retarders disposed adjacent to the input face;
an achromatic quarter-wave plate disposed adjacent the first face;
a first mirror disposed outwardly from the achromatic quarter-wave plate;
a first switchable quarter-wave plate disposed adjacent the second face; and
a second mirror disposed outwardly from the switchable quarter-wave plate; and
a programmable spectral imaging subsystem optically coupled to the programmable polarimetry subsystem and the focal plane array, the spectral imaging system including an electrically switchable disperser configurable between an ON state in which the disperser spectrally disperses incident electromagnetic radiation to provide spectrally dispersed electromagnetic radiation to the focal plane array, and an OFF state in which the disperser is configured as a first substantially clear aperture that passes the electromagnetic radiation to the focal plane array, wherein the electrically switchable disperser includes:
a first passive polarization grating;
a second passive polarization grating;
a switchable half-wave plate positioned between the first and second passive polarization gratings; and
a second switchable quarter-wave plate positioned between the programmable polarimetry subsystem and the electrically switchable disperser.

11. The multifunction imager of claim 10, wherein the at least two switchable phase retarders disposed adjacent to the input face include at least three switchable phase retarders disposed adjacent to the input face.

* * * * *

UNITED STATES PATENT AND TRADEMARK OFFICE
CERTIFICATE OF CORRECTION

| | | |
|---|---|---|
| PATENT NO. | : 9,631,973 B2 | Page 1 of 1 |
| APPLICATION NO. | : 14/340072 | |
| DATED | : April 25, 2017 | |
| INVENTOR(S) | : Terry Dorschner | |

It is certified that error appears in the above-identified patent and that said Letters Patent is hereby corrected as shown below:

In the Specification

At Column 3, Line number 32, delete "minor" and replace with --mirror--.

At Column 5, Line number 67, delete "minor" and replace with --mirror--.

At Column 6, Line number 3, delete "minor" and replace with --mirror--.

At Column 8, Line number 20, delete "minor" and replace with --mirror--.

At Column 8, Line number 22, delete "minor" and replace with --mirror--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*